United States Patent
Howard

[11] Patent Number: 5,991,111
[45] Date of Patent: Nov. 23, 1999

[54] EDGE RECORDED MAGNETIC TAPE AND READ HEAD

[76] Inventor: James R. Howard, 4300 Dover Ave., Independence, Mo. 64055

[21] Appl. No.: 08/903,675

[22] Filed: Jul. 31, 1997

[51] Int. Cl.$^6$ .................................................... G11B 15/18
[52] U.S. Cl. .......................... 360/72.2; 360/134; 360/135
[58] Field of Search ................................. 360/72.1, 72.2, 360/105, 131, 134, 135, 75

[56] References Cited

U.S. PATENT DOCUMENTS

| | | | |
|---|---|---|---|
| Re. 33,765 | 12/1991 | Takahashi et al. | 360/72.2 |
| 1,065,135 | 6/1913 | Ivatts . | |
| 2,701,718 | 2/1955 | Allen et al. . | |
| 2,802,290 | 8/1957 | Carey . | |
| 2,829,618 | 4/1958 | Ostergard . | |
| 3,125,749 | 3/1964 | Graves . | |
| 3,130,393 | 4/1964 | Gutterman . | |
| 3,183,495 | 5/1965 | Blain . | |
| 3,644,683 | 2/1972 | Braun | 360/13 |
| 3,801,750 | 4/1974 | Beaumont | 360/15 |
| 3,810,246 | 5/1974 | Stone, Jr. et al. | 360/134 |
| 3,812,538 | 5/1974 | Stone, Jr. et al. | 360/134 |
| 3,943,879 | 3/1976 | Stone, Jr. et al. | 360/132 X |
| 4,018,947 | 4/1977 | Stone, Jr. | 427/284 |
| 4,345,540 | 8/1982 | Karmin | 360/137 X |
| 4,356,521 | 10/1982 | Selim | 360/72.2 |
| 4,644,420 | 2/1987 | Buchan | 360/51 |

*Primary Examiner*—Andrew L. Sniezek
*Attorney, Agent, or Firm*—Hovey, Williams, Timmons & Collins

[57] ABSTRACT

A magnetic recording medium (12) and a magnetic recording apparatus (10) that makes use of the magnetic recording medium is disclosed. The magnetic recording medium includes an elongated magnetic base film that is significantly thicker than conventional magnetic tape and that presents opposed front (20) and rear faces (22) and opposed upper (24) and lower edges (26) extending between the front and rear faces. One or more layers of magnetic material is coated on both the front face and on the upper edge of the base film. Data is recorded on the front face of the base film in a conventional manner, and sequencing or locating information is recorded on the upper edge of the base film. This permits a read/write head (18) to hover over the base film to read the sequencing information on the upper edge of the base film for locating the position of desired data stored on the front face of the base film. Once the desired portion of the base film is located, the read/write head is plunged or lowered adjacent the front face of the base film to read the desired data from and/or write data to the base film.

7 Claims, 1 Drawing Sheet

EDGE RECORDED MAGNETIC TAPE AND READ HEAD

BACKGROUND OF THE INVENTION

1. Field of the Invention

The present invention relates to magnetic recording medium such as magnetic tape for recording data thereon. More particularly, the present invention relates to a magnetic recording medium that permits rapid location and identification of data recorded on the medium.

2. Description of the Prior Art

Cassette tapes are commonly used for recording music, dictation, and other data. A typical cassette tape has a length of magnetic tape wound between a pair of rotatable spools supported in a plastic case. Unfortunately, only the tape that is exposed between the spools can be read from or written to. To access the data on the wound portions of the tape, the tape must first be forwarded or reversed until the desired portion of the tape is exposed between the spools. Several forwarding and/or reversing attempts are often required to locate the portions of the tape having the desired data stored thereon. Those skilled in the art will appreciate that locating information on a tape in this manner is extremely inconvenient and time-consuming.

Computer disks, which are typically formed from a rotatable platter having a plurality of concentric tracks formed thereon each having a plurality of adjacent sectors for storing data, do not suffer from the above limitations because a read/write head can scan over the tracks to locate the desired data. However, computer disks are much more expensive to manufacture than conventional cassette tapes and therefore are not practical for many applications. Moreover, recording to a computer disk is more difficult and requires more complicated equipment than when recording to a conventional cassette tape.

OBJECTS AND SUMMARY OF THE INVENTION

In view of the foregoing, it is an object of the present invention to provide an improved magnetic recording medium.

It is a more particular object of the present invention to provide a magnetic recording medium that permits rapid location and identification of data recorded thereon.

It is another object of the present invention to provide a magnetic recording medium that combines the advantages of both conventional cassette tapes and computer disks without their associated limitations.

The present invention achieves these objects and other objects that become evident from the following description of the preferred embodiments of the invention by providing an improved magnetic recording medium and an improved magnetic recording apparatus that makes use of the magnetic recording medium. The magnetic recording medium of the present invention broadly includes an elongated magnetic base film that is significantly thicker than conventional magnetic tape and that presents opposed front and rear faces and opposed upper and lower edges extending between the front and rear faces. A layer of magnetic material is coated on both the front face and on the upper edge of the base film.

Information such as music, dictation or other data is recorded on the front face of the base film in a conventional manner. Advantageously, sequencing or locating information is also recorded on the upper edge of the base film. This configuration permits a read/write head to hover over the base film to read the sequencing information on the upper edge of the base film for locating the position of desired data stored on the front face of the base film. Once the desired portion of the base film is located, the read/write head can then be plunged or lowered adjacent the front face of the base film to read the desired data from and/or write data to the front face of the base film in a conventional manner.

The base film is preferably supported and loosely wound on a rotatable platter in an upright, concentric, spiral configuration. This permits the read/write head to more easily hover over the upper edge of the tape to read the sequencing information and therefore locate the desired data and to then subsequently be lowered to read the data from the desired portion of the base film.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
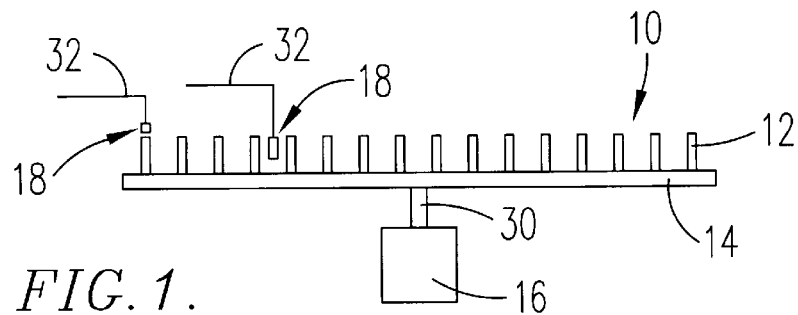
FIG. 1 is a vertical section view of a magnetic recording apparatus constructed in accordance with a preferred embodiment of the present invention.

FIG. 1 illustrates a magnetic recording apparatus 10 constructed in accordance with a preferred embodiment of the invention. The recording apparatus broadly includes a magnetic recording medium 12 for recording data thereon, a rotatable platter 14 for supporting the recording medium, a motor 16 for rotating the platter and the recording medium, and a read/write head 18 for reading data from and writing data to the recording medium.

In more detail, the magnetic recording medium 12 preferably comprises a length of magnetic base film substrate formed of plastic, polyester, or other suitable, flexible material. The base film presents opposed front and rear faces 20, 22 and opposed upper and lower edges 24, 26 extending between the front and rear faces as best illustrated in FIGS. 3 and 4.

The base film 12 may be of any desired length and is preferably approximately 0.1–2" in width. As best illustrated in FIG. 4, the base film, which is preferably approximately 0.004–0.1" in thickness, is significantly thicker than conventional magnetic tape so that it can receive a magnetic coating thereon as described below. The base film may be formed of a single length of thick magnetic tape material or two or more lengths of conventional magnetic tape laminated or otherwise attached together.

Figure 3:
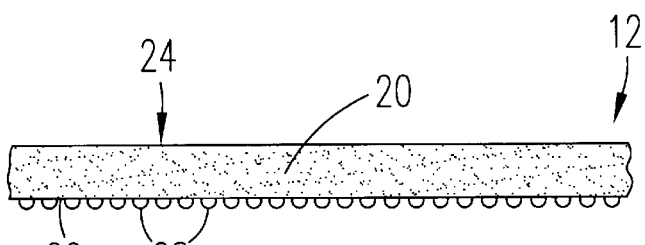
FIG. 3 is a fragmented elevation view of the magnetic recording medium of the recording apparatus.
Figure 4:
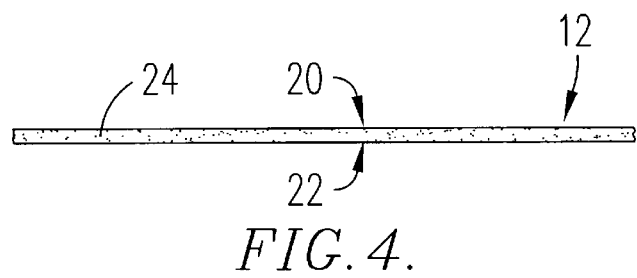
FIG. 4 is a fragmented plan view of the magnetic recording medium illustrated in FIG. 3.

Both the front face 20 and the upper edge 24 of the base film 12 is coated with one or more layers of magnetic material as depicted by the specks or dots in FIGS. 3 and 4. The magnetic material is preferably an iron oxide material such as gamma oxide ($Fe_2O_3$). The majority of the data that is stored on the base film is recorded on the front face of the base film in a conventional manner, however, sequencing or locating information is also recorded on the upper edge of the base film as described below.

Figure 2:
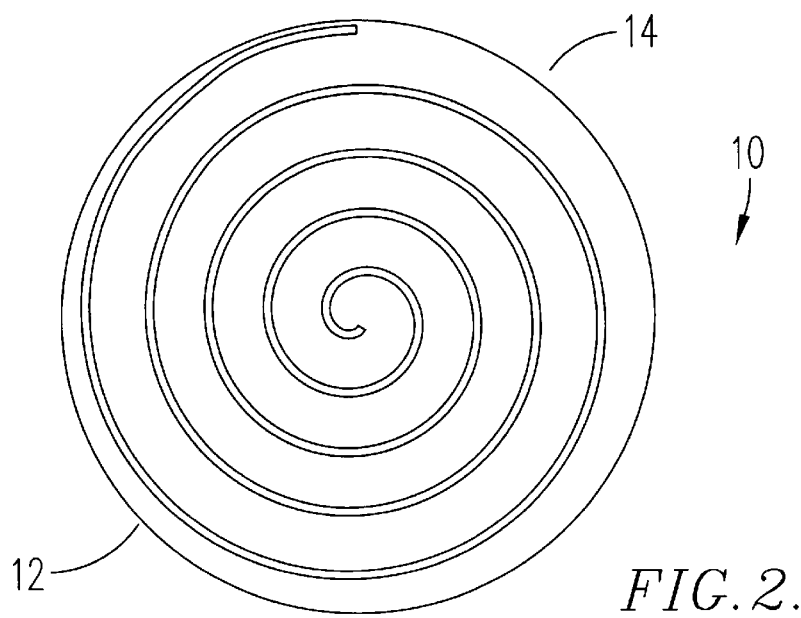
FIG. 2 is a plan view of the magnetic recording apparatus of FIG. 1.

The support platter 14 is preferably disk-shaped and may be formed of any suitable material such as plastic. The base film 12 is preferably supported and loosely wound on the platter in an upright, concentric, spiral configuration as best illustrated in FIG. 2. The base film may be attached to the platter in any conventional manner. For example, as illustrated in FIG. 2, hook or loop material 28 may be attached to the lower edge 26 of the base film, and corresponding interlocking loop or hook material may be attached to the upper face of the platter so that the base film is securely yet removably attached to the platter.

The support platter 14 and the base film supported thereon are rotatably coupled to the motor 16. The motor is conventional, and in preferred forms, is oriented vertically so that its rotatable shaft 30 is secured to the underside of the platter as illustrated in FIG. 1.

The read/write head 18 is configured for reading data from and writing date to both the front face 20 and the upper edge 24 of the base film. The read/write head is supported from a positioning arm 32 that can move the read/write head both laterally across the width of the platter 14 and up and down along the height of the base film.

In operation, the base film 12 is typically recorded with information such as music or other data on its front face 20 and sequencing information on its upper edge 24. The sequencing information is preferably a short code that identifies various locations or positions along the length of the base film, but may also be a code that identifies the specific data stored at various locations along the length of the film. Alternately, the front face of the base film may initially be left blank so that data may be recorded thereon during use as with dictating tapes.

To locate specific data recorded on the base film, the positioning arm 32 first moves the read/write head 18 laterally over the platter 14 and base film so that it hovers over the base film as depicted by the leftmost representation of the read/write head 18 in FIG. 1. While in this position, the read/write head reads the sequencing information on the upper edge 24 of the base film, and the positioning arm continues to move the read/write laterally across the platter until the sequencing information identifying the desired data is located.

Once the desired portion of the tape is located, the positioning arm 32 then plunges or lowers the read/write head 18 between adjacent concentric portions of the base film as depicted by the rightmost representation of the read/write head 18 in FIG. 1. While in this position, the read/write head reads the desired data from and/or writes data to the front face 20 of the base film.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. A magnetic recording and reproducing device including a magnetic recording medium for recording data thereon comprising:
    an elongated-base film presenting opposed front and rear faces and opposed upper and lower edges extending between the front and rear faces;
    a layer of magnetic coating on the front face of the base film for recording the data thereon;
    a layer of magnetic coating on the upper edge of the base film for recording sequencing information thereon, wherein the sequencing information is used for locating the data stored on the front face of the base film;
    a read/write head for reading the data from and writing the data to the base film; and
    means for positioning the read/write head above the upper edge of the base film for reading the sequencing information from the upper edge of the base film for locating a desired portion of the data and then for subsequently lowering the read/write head adjacent the front face of the base film for reading the desired portion of the data.

2. A magnetic recording medium for recording data thereon comprising:
    an elongated base film presenting opposed front and rear faces and opposed upper and lower edges extending between the front and rear faces;
    a layer of magnetic coating on the front face of the base film for recording the data thereon;
    a layer of magnetic coating on the upper edge of the base film for recording sequencing information thereon, wherein the sequencing information is used for locating the data stored on the front face of the base film; and
    a rotatable platter having an upper face for supporting the base film in an upright orientation,
    the base film being secured to the platter by hook material attached to the lower edge of the base film and interlocking loop material attached to the upper face of the platter.

3. A magnetic recording apparatus comprising:
    a recording medium for recording data thereon including
        an elongated base film presenting opposed front and rear faces and opposed upper and lower edges extending between the front and rear faces,
        a layer of magnetic coating on the front face of the base film for recording the data thereon, and
        a layer of magnetic coating on the upper edge of the base film for recording sequencing information thereon used for locating the data stored on the front face of the base film;
    a rotatable platter having an upper face for supporting the base film in an upright orientation;
    a read/write head for reading the data from and writing the data to the base film; and
    means for positioning the read/write head above the upper edge of the base film for reading the sequencing information from the upper edge of the base film for locating a desired portion of the data and then for subsequently lowering the read/write head adjacent the front face of the base film for reading the desired portion of the data.

4. The magnetic recording apparatus as set forth in claim 3, the base film being loosely wound on the platter in a concentric spiral configuration.

5. The magnetic recording apparatus as set forth in claim 4, further including means for rotating the platter and the base film supported thereon.

6. The magnetic recording apparatus as set forth in claim 3, the base film being secured to the platter by hook material attached to the lower edge of the base film and interlocking loop material attached to the upper face of the platter.

7. A magnetic recording and reproducing device including a magnetic recording medium for recording data thereon comprising:
    an elongated base film presenting opposed front and rear faces and opposed upper and lower edges extending between the front and rear faces;

a layer of magnetic coating on the front face of the base film for recording the data thereon;

a layer of magnetic coating on the upper edge of the base film for recording sequencing information thereon, wherein the sequencing information is used for locating the data stored on the front face of the base film;

a read/write head for reading the data from and writing the data to the base film; and a positioning arm for moving the read/write head above the upper edge of the base film for reading the sequencing information from the upper edge of the base film for locating a desired portion of the data and then for subsequently lowering the read/write head adjacent the front face of the base film for reading the desired portion of the data.

* * * * *